June 4, 1957 H. GANZ 2,794,479
BANDAGE CUTTING AND FORMING MACHINE
Filed Sept. 10, 1954 8 Sheets-Sheet 1

INVENTOR
HENRY GANZ
BY
Arnold J. Worfolk
ATTORNEY

June 4, 1957 H. GANZ 2,794,479
BANDAGE CUTTING AND FORMING MACHINE
Filed Sept. 10, 1954 8 Sheets-Sheet 4

INVENTOR
HENRY GANZ
BY
ATTORNEY

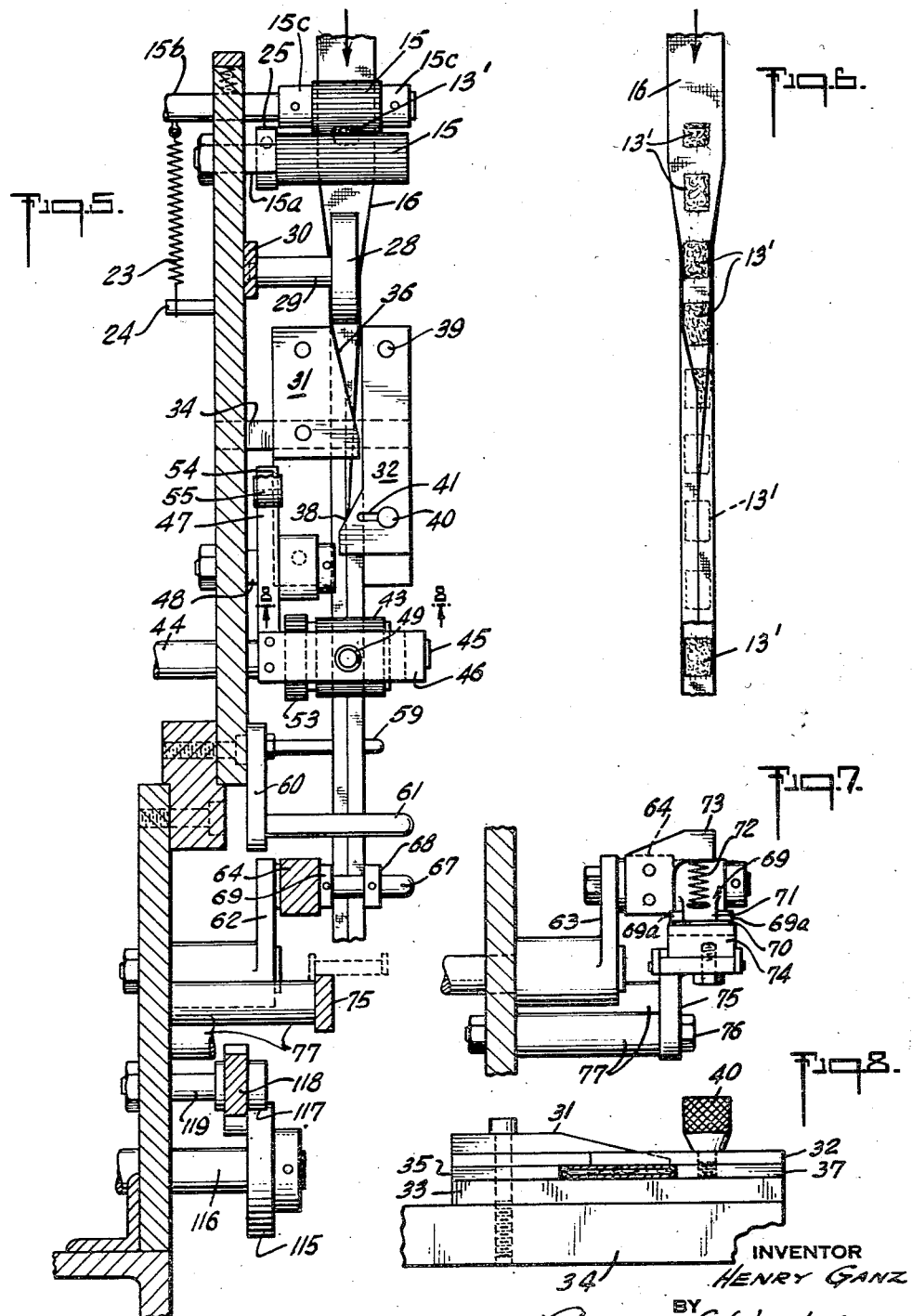

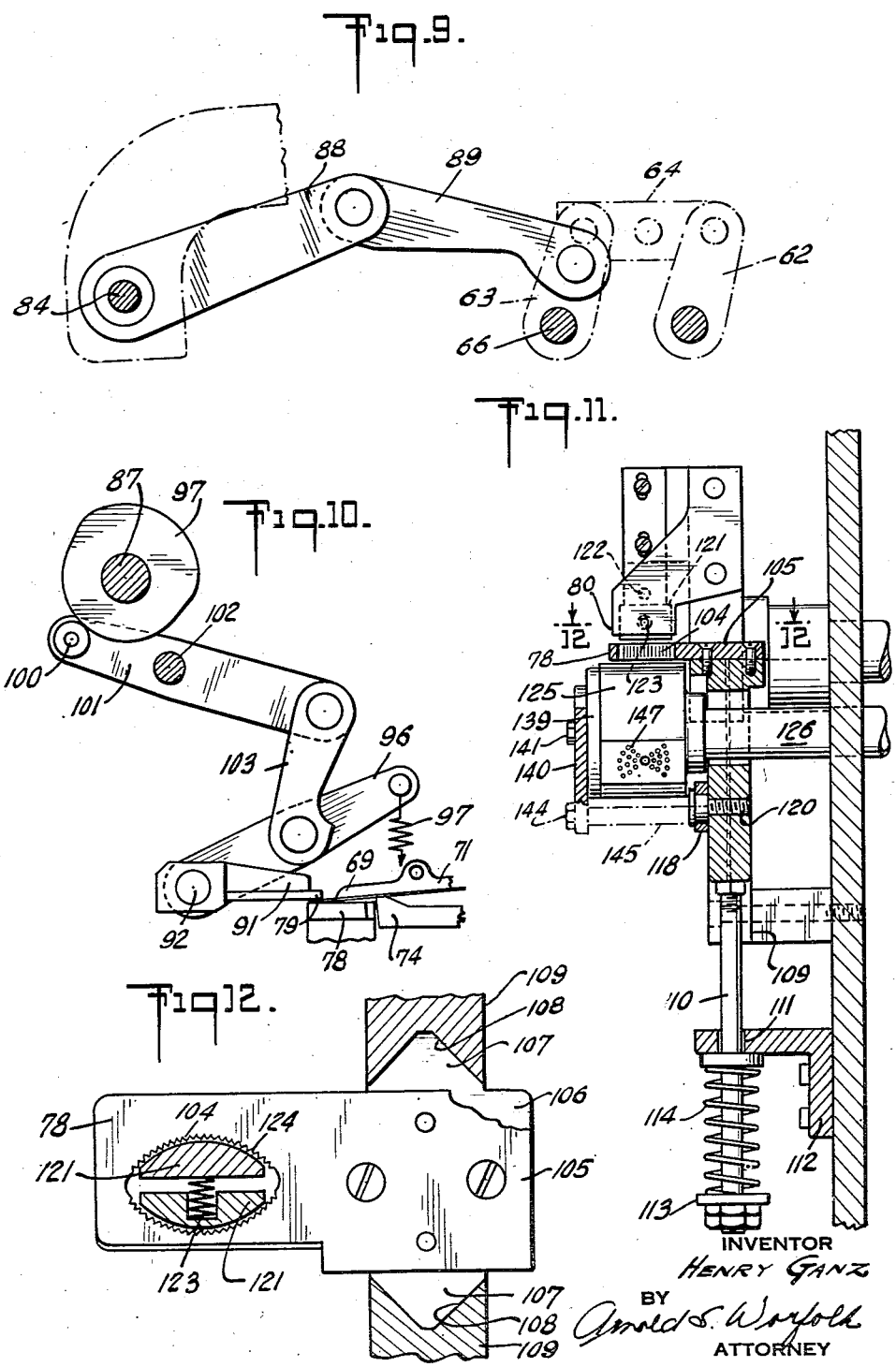

June 4, 1957 H. GANZ 2,794,479
BANDAGE CUTTING AND FORMING MACHINE
Filed Sept. 10, 1954 8 Sheets-Sheet 7
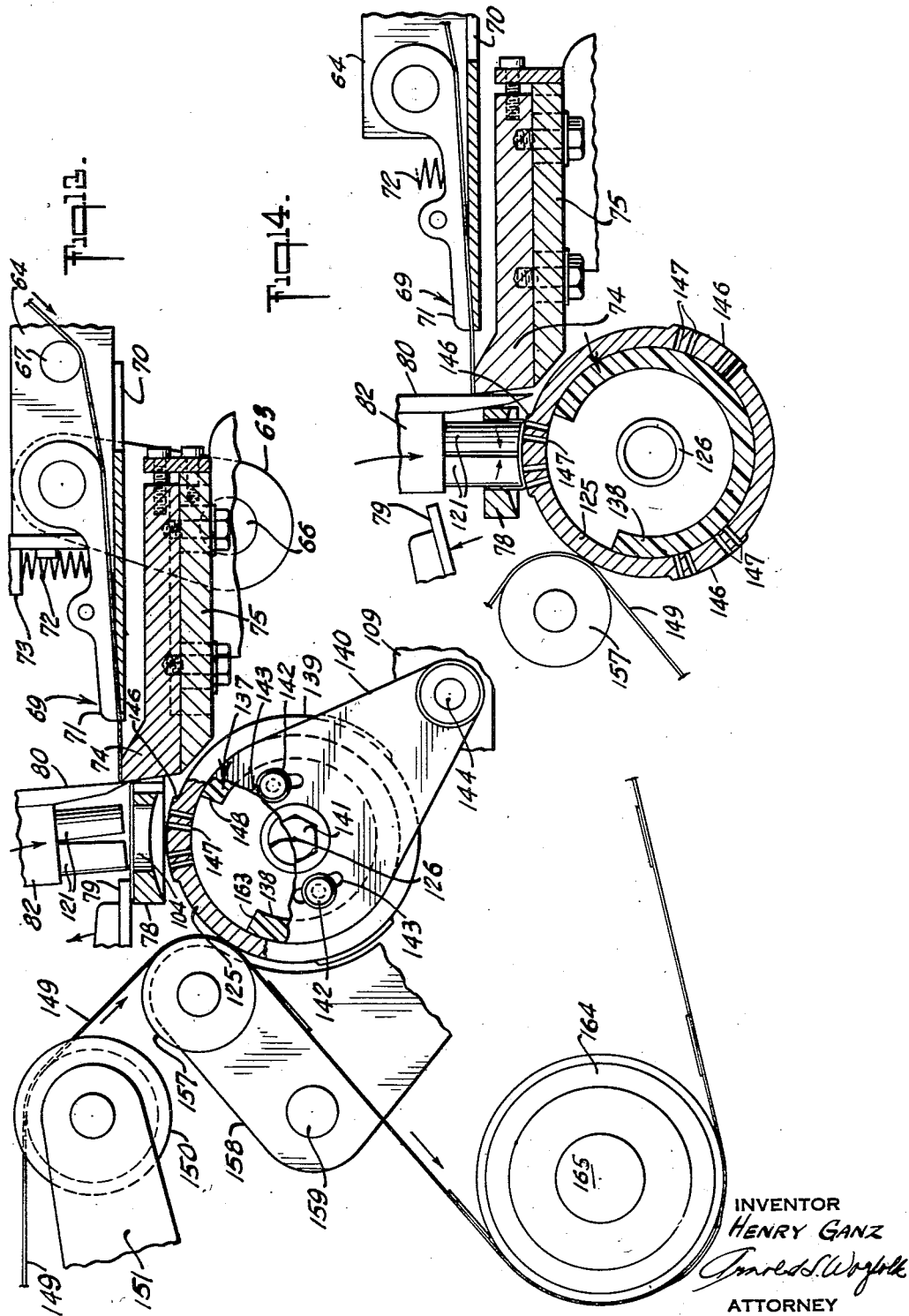
INVENTOR
HENRY GANZ
ATTORNEY

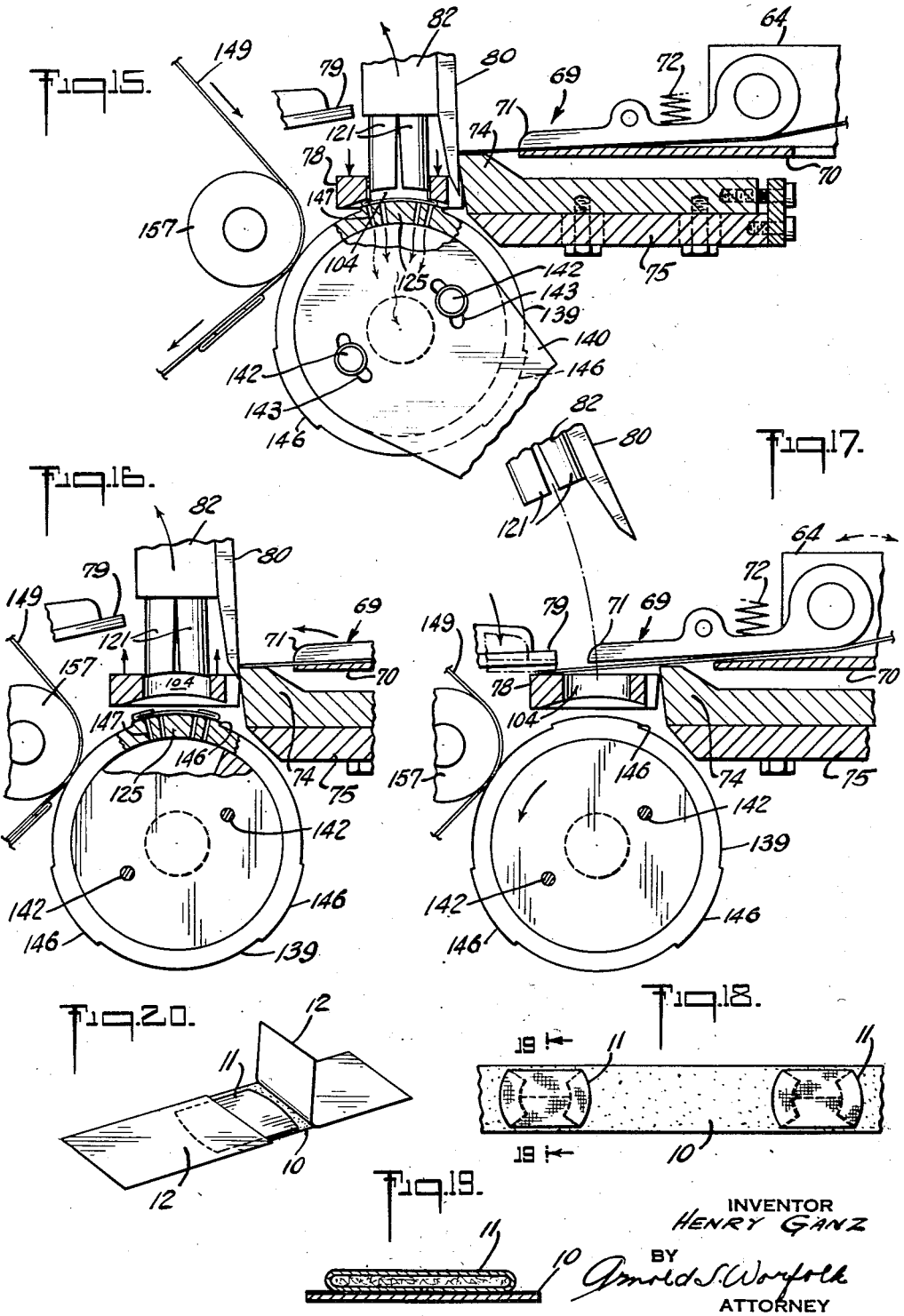

United States Patent Office 2,794,479
Patented June 4, 1957

2,794,479

BANDAGE CUTTING AND FORMING MACHINE

Henry Ganz, West Englewood, N. J., assignor to Johnson & Johnson, a corporation of New Jersey Application September 10, 1954, Serial No. 455,338

17 Claims. (Cl. 154—1)

This invention relates to a machine for cutting flexible material into sections, forming the sections into pads. Although it has wide range of utility, it is particularly useful in connection with a machine for cutting and assembling different parts of an adhesive bandage.

In the machine used to illustrate the invention, a strand of absorbent material such as cotton is attenuated as it passes through a draw frame having a plurality of pairs of rotating rolls, which are arrested intermittently and one pair of rolls which rotate continuously. The attenuated strand of cotton is separated into short patches, as the draw frame rolls are arrested, by the last pair of continuously rotating rolls.

Continuous rotation of the last pair of rolls in the frame is effected by a strip of gauze wider than the attenuated cotton strand and which passes through the bite of said rolls in the same direction as the cotton, so that the separated or broken-off patches thereof are pressed into engagement with the gauze at evenly spaced intervals therealong. The gauze then is infolded along both its marginal edges over the cotton patches which have been pressed into engagement with it. The composite strip thus formed henceforth travels through the machine as a unit.

At an appropriate station in the machine, the composite strip is cut transversely midway between each spaced patch of cotton to produce a short flat tubular section of gauze extending at each end beyond the cotton patch enclosed within it. Each severed tubular section of the gauze composite is delivered to a die which folds back the end portions of gauze that extend beyond the cotton patches to form a pad, which is delivered to an adhesive tape carrier for further conveyance through the machine. In accordance with the invention, the die mechanism is constructed such that the ends of the pad have a rounded configuration while the edges of the folded-back flaps angle inwardly from the lateral edges of the pad itself. In a pad thus formed, one face thereof is entirely devoid of folded-back portions which are presented all at the opposite face of the pad, and each of the four peripheral edge sections presents but a single fold throughout. A pad thus formed has neatness, as well as many other advantages, many of which are set forth in my co-pending application Ser. No. 455,163, filed September 10, 1954, which is a continuation-in-part of application Ser. No. 424,800, filed April 22, 1954, now abandoned.

Also in accordance with the invention, the machine is equipped with a device that cooperates with the die to make the folded pad member and which is equipped with vacuum means cyclically operated to maintain the pad member in its folded condition and in a given location on said device. The device is moved periodically to transfer the pad from the position where it is formed to a position where it is transferred to the adhesive face of a continuous strip of adhesive tape. At the moment of transfer, the vacuum is cut off so that the pad is deposited upon the adhesive tape without disturbance. Thereafter, the adhesive tape with absorbent pads attached to it at regular intervals along its length, travels on to stages where other operations are performed upon it, such as the application of protective media, its severance into individual bandages, wrapping, etc.

In addition to the novel character of the cutting and transfer mechanism, the machine as a whole is unique in that most of the many reciprocating and intermittently moving parts have a substantially constant rate of acceleration and deceleration enabling the machine, despite its high speed of operation, to perform smoothly and with a minimum of noise, wear and tear.

Various other objects, features and advantages of the invention are apparent from the following description read in conjunction with the accompanying drawings in which:

Fig. 5 is a vertical sectional view on line 5—5 of Fig. 1;

Fig. 6 is a face view illustrating the folding of the composite gauze and cotton filler;

Fig. 7 is a partial vertical sectional view on line 7—7 of Fig. 1;

Fig. 8 is a horizontal sectional view on line 8—8 of Fig. 5;

Fig. 9 is a front elevational view of a driving connection for endwise feeding the composite strip to the cutting mechanism;

Fig. 10 is a partial front elevational view of a clamp and its operating mechanism for properly locating the pad composite preparatory to cutting and forming;

Fig. 11 is a partial transverse vertical sectional view on line 11—11 of Fig. 1;

Fig. 12 is a partial horizontal sectional view on line 12—12 of Fig. 11;

Fig. 13 is a partial vertical sectional view through the strip feeding and severing and the pad forming and transferring mechanism, the parts being shown in position just after a portion of the composite strip has been severed;

Figs. 14 to 17 are views similar to Fig. 13, but showing the parts at various other stages of the machine cycle;

Fig. 18 illustrates a strip of adhesive tape material to which absorbent pads have been applied but before it has been cut into individual adhesive bandages;

Fig. 19 is a transverse sectional view on line 19—19 of Fig. 18; and

Fig. 20 is a perspective view of an adhesive bandage with its protective facing strip partly removed at one side to display the end configuration of the absorbent pad, which may be one of the characteristics of an adhesive bandage made by mechanism incorporating the invention.

While many of the principles of the present invention are of general application, for purpose of illustration, they have been shown in connection with a machine for making adhesive bandages of the type shown in Fig. 20. Such a bandage may consist of a backing 10 of adhesive tape made from fabric, plastic or the like faced with a normally tacky pressure-sensitive adhesive. To the adhesive surface of the backing 10 there is attached an absorbent pad 11 whose dimensions are such that substantial portions of the adhesive backing extend beyond the ends of the pad for adhesion to the underlying skin of the user to retain the pad in place. A separate protective facing member 12 covers each approximate one-half portion of the pad 11 and the portion of the adhesive backing member adjacent thereto. The protective facing members help to retain the bandage in sanitary condition until they are removed preparatory to its use. In the illustrated bandage, the pad 11 is of the type claimed in the co-pending application previously referred to and which in general has an outer envelope of gauze and an inner filler of cotton, cellulose, or other absorbent material to give the pad great absorbency.

Figure 1:
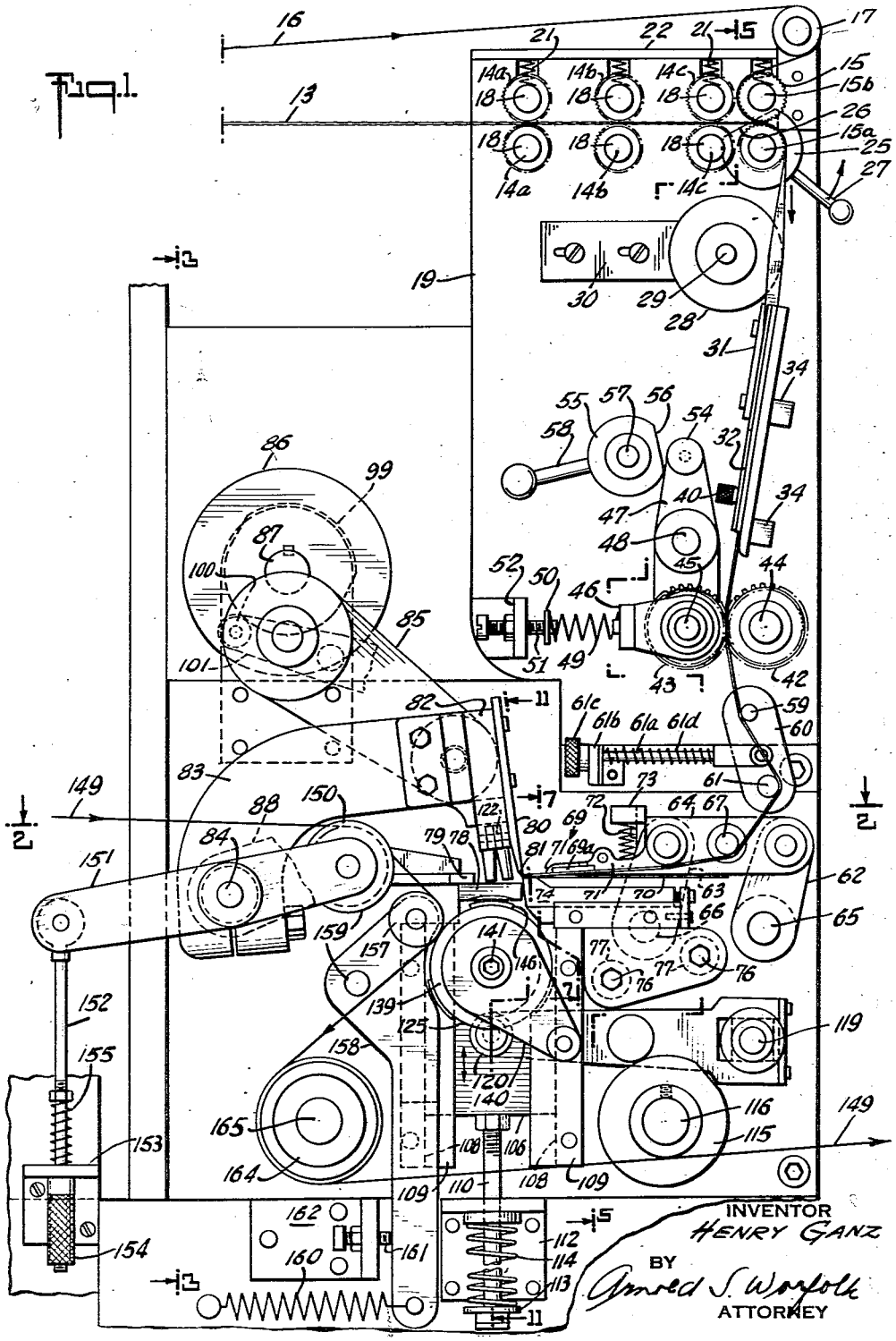
Fig. 1 is a front elevation of a part of an adhesive bandage machine incorporating the present improvements.

If the filler material is cotton, a continuous strand 13 thereof is attenuated and then broken into small swatches from which are made the pads for the individual bandages (Fig. 1). For this purpose, the machine is equipped with a device similar to a draw frame which, in the embodiment illustrated, comprises four pairs of fluted rolls, 14a, 14b, 14c and 15. The first three pairs, 14a, 14b and 14c are draw rolls intermittently rotated at successively higher speeds to attenuate or draft the strand of cotton as it passes successively through the bites thereof. The fourth or last pair of rolls 15 are rotated continuously at a speed higher than that of the pair 14c immediately preceding it. Despite difference in speeds, the periods of rotation of the first three pairs of draw rolls are the same as are likewise their periods of rest. The strand of cotton, therefore, while attenuated remains intact as it feeds through the first three pairs of rolls. However, each time rotation of the draw rolls, 14a, 14b, 14c, is arrested, continued rotation of the last pair of rolls 15 acts to break off from the end of the strand a piece of cotton 13' of length suitable to form the filling for the adhesive bandage pad.

Gauze for forming the bandage pad proceeds from a source (not shown) in the form of a continuous web 16 approximately twice the width of a finished bandage pad, over a guide roll 17 and then around the front of the upper of the two continuously rotating rolls 15 and then between said two rolls so as intimately to engage the pieces of cotton broken off from the continuous strand 13. The period during which the draw rolls 14a, 14b, 14c are in operation determines the length of the cotton piece broken off from the strand. The period during which they are at rest determines the interval between the pieces of cotton deposited on the gauze which thereafter serves as a carrier for the cotton pieces as it travels along in the machine on its way toward the position where the bandage ultimately is made up.

The draw frame rolls, 14a, 14b, 14c, are all fixed at the front ends of fore and aft parallel shafts 18 mounted for rotation in a front machine frame member 19 and a back machine frame member 20 (upper part not shown), and which are geared together for operation in the manner described by devices not shown, but which are well known in the art (Fig. 1). The bottom draw rolls are fixed in so far as the position of their axes are concerned and are positively driven, but the upper rolls are arranged for yielding movement in an upward direction to accommodate for variations in the thickness of the cotton strand, the upward yield being against the reaction of a spring 21 with which each of the pairs of draw rolls is equipped and which reacts between the shaft on which its associated roll is mounted and an overlying rail 22 secured to the upper edge of the frame member 19. The drive of the upper rolls is merely through the interaction of their fluted surfaces with the corresponding surfaces of the lower rolls.

As distinguished from the intermittently operated draw frame rolls, the last pair in the frame, i. e., the continuously operating pair 15, are driven from the gauze strip 16 itself which, as previously stated, passes through the bite of the rolls in the direction of cotton feed (Fig. 5). The lower of the rolls 15 idles on a short shaft 15a fixed in and extending forwardly from the front machine plate 19. The upper of the rolls 15 likewise idles on a fore and aft shaft 15b which extends between and is supported by front and rear machine frame members, 19 and 20, in a manner similar to the shafts 18, except that it does not rotate and has an additional spring 23, whose lower end is anchored to an underlying fixed pin 24, biasing it in a downward direction against the lower of the rolls 15. The upper roll 15 is held against endwise movement on the shaft 15b by a pair of spaced collars 15c pinioned thereto and between which said roll is located. As the gauze strip is pulled along in a manner hereinafter described, it turns the rolls in a rather positive manner because of the forces urging them together and the interaction of their correspondingly fluted surfaces. These forces also urge the cotton pieces into close engagement with the gauze as they are broken off in the manner previously mentioned.

Because of the forces urging the rolls 15 together, provision is made for forcing them apart manually when it is necessary to thread the gauze between them. To this end, there is rotatively mounted on the shaft 15a of the lower of the break-off rolls 15 and between said roll and the front frame 19, a disc 25 having a segmental portion removed to present a flat surface 26, which has a handle 27 extending from its periphery to facilitate manual rotation about the shaft 18 on which it is mounted (Figs. 1 and 5). When the disc 25 is in its normal position, its flat surface 26 is opposite the shaft 15b of the overlying break-off roll 15 and permits such upper roll to assume its normal position as determined by the thickness of the cotton or cotton and gauze between it and its underlying roll (Fig. 1). However, when it is desired to lift the overlying roll against reaction of the spring 23 to permit threading the gauze without difficulty between the rolls 15, handle 27 is turned upwardly to bring the high portion of disc 25 into engagement with the shaft 15b carrying the upper of such rolls. As the disc 25 is turned thus, shaft 15b is cammed upwardly to separate the rolls 15 sufficiently to permit the gauze threading operation. The rolls 15 remain separated so long as the circular portion of disc 25 remains in contact with the shaft on which the overlying roll 15 is mounted. Restoring the disc 25 to its normal position by turning the handle 27 downwardly releases the overlying roll 15 so that it, too, can return to its normal operative position.

After passing between the break-off rolls 15, the gauze which now carries broken-off patches of cotton 13' at equally spaced intervals, is pulled downwardly continuously to a mechanism where its lateral margins that extend beyond the patches of cotton are infolded upon the cotton patches and upon the body portion of the gauze itself so as in effect to make a folded sheath of gauze in which the cotton patches are contained (Figs. 1, 5, and 6). The gauze folding mechanism consists in part of an idler roll 28 rotatively mounted on a short stub shaft 29 extending forwardly from a bracket 30 secured at the front of the front machine frame member 19 and which is adjustable along the face of the frame member a limited distance in a lateral direction properly to locate the idler roll in position to inaugurate the folding operation to which reference has been made. The idler roll 28 folds up the marginal portions of the gauze perpendicular with respect to the main or body portion of the gauze to which the cotton has adhered and after this initial folding operation has been completed, one folded-up marginal portion and then the other are turned inwardly to complete the sheath. These latter folding operations are effected by two guide members, 31 and 32, located immediately below the idler roller (Figs. 1, 5 and 8). The guide member 31 is a flat plate fastened to a substantially vertical base plate 33, attached to supports 34 which extend forwardly from the main front frame 19 of the machine. A flat spacing plate 35 secured between the guide member 31 and the base plate 33 provides necessary clearance between their adjacent faces to facilitate passage of the gauze and cotton composite. The guide member 31 has a front edge 36 angling from a plane defined by the rear face of the idler roller 28 downwardly and forwardly toward a plane defined by the front face of the idler roller and when the rear, turned-up marginal portion of the gauze is threaded beneath the guide 31 and pulled downwardly, the gauze in its rear marginal portion is turned over upon itself by engagement with the angularly disposed edge 36.

The front, folded-up marginal portion of the gauze is in like manner turned rearwardly to complete formation of the gauze composite by the guide member 32 previously mentioned. This member is also mounted on the base plate 33 but spaced facewise therefrom by an intermediate spacing plate 37 to provide necessary clearance for the traveling gauze composite as in the case of the guide member 31. The member 32 presents an edge 38 which angles downwardly but rearwardly from the plane of the front face of the guide roller 28, to the plane of the rear face thereof, and when the front turned-up marginal edge of the gauze engages this angled edge, it, too, is folded down as the gauze is pulled beneath guide member 32 as was the other marginal edge of the gauze referred to before.

When the machine is in operation, the guide member 32 is held in its normal position as described, at the top by a pivot pin 39, which passes through a hole in the guide plate and is threaded into the fixed spacing member underlying it, and at the bottom by a thumb screw 40 with knurled head, which passes through a slot 41 in the guide member and which likewise is threaded into the fixed spacing member underlying it. The knurled head enables the screw 40 readily to be backed out sufficiently to permit the guide member 32 to be swung forwardly through a distance determined by the length of the slot to facilitate manually threading the gauze and cotton patch composite through the guides in preparing the machine for operation. It seems clear from what has been said, but it might bear emphasis at this point that both inturned marginal flaps of the composite gauze cotton strip are presented by the same face of the strip, the reverse face being entirely devoid of folded-back portions whatsoever.

The mechanism for feeding or pulling the gauze through the break-off rolls 15 and through the marginal folding devices just referred to will now be described. This mechanism includes in part, a pair of fluted rolls, 42 and 43, fixed respectively on shafts 44 and 45 disposed in the same horizontal plane, parallel with each other and extending in a direction fore and aft of the machine (Figs. 1 and 5). The shaft 44 is journaled in both the front and the rear machine frame plates 19 and is driven positively and continuously in manner hereinafter described.

The shaft 45 at its opposite ends is journaled for rotation in the spaced parallel legs of a yoke 46 having a cross piece extending in a fore and aft direction, joining the two parallel legs together. The yoke is fixed at the lower end of a vertical lever 47 fulcrumed midway of its length on an overlying pivot 48. The roll 43 is urged toward its counterpart 42 by a spring 49 which reacts between the yoke and a small opposed bearing plate 50 fixed on a screw 51 threaded through a bracket 52 fixed on the front plate of the machine. The screw 51 is adjustable in an endwise direction to vary the force with which the rolls 42 and 43, as they rotate, act upon the gauze-cotton composite strip to feed it along. The shafts 44 and 45 are provided with a pair of intermeshing gears 53 just at the rear of their fluted portions so that the shaft 45 rotates continuously and at the same speed as the shaft 44 from which it is driven.

The rolls 42 and 43 are likewise separable to a degree necessary to thread the composite gauze-cotton strip between them preparatory to making the machine ready for operation. To this end, the lever 47 at its upper end is equipped with an antifriction roller 54 adapted to cooperate with the edge of a disc 55 with flattened segment 56 similar to the disc 25 previously described for separating the break-off rollers. The disc 55 is mounted for rotation on a forwardly extending stud 57 fixed in the front plate 19 of the machine (Figs. 1 and 5). It is rotated by means of a handle 58 extending radially from its edge. When the flat, segmented portion 56 of the disc is opposite the antifriction roller 54, the parts are in their normal operative positions wherein the fluted roll 43 is free to assume whatever position is dictated by the thickness of the gauze-strip composite passing through the machine. However, when the disc 55 is turned manually by its handle 58 to bring the circular portion of its edge opposite the antifriction roller 55, the lever 47 is rocked clockwise to move the fluted roll 43 at the lower end thereof away from its opposed roll 42, thereby to facilitate slipping the gauze-cotton composite strip edgewise in between them.

From the feed rolls 42, 43 the folded gauze-cotton composite strip passes down to the left of a fixed guide pin 59 projecting forwardly from the front frame plate of the machine (Figs. 1 and 5). A small plate 60 pivots at its upper end on the guide pin 59 and carries, at its lower end, another guide pin 61 similar to and parallel with the guide pin 59. The gauze-cotton composite strip passes to the right of the guide pin 61 as it threads its way downwardly. The pins 59 and 61 act to maintain the strip in its folded condition as it travels down to a reciprocating feeding mechanism which serves to measure off portions of the strip to be severed to make the bandage pads. The location of the guide pin 61 also serves to determine the exact length of the path traversed by the gauze-cotton composite strip in its passage from the point where the cotton patches are broken off to the point where the composite strip is severed. This is important because it enables the strip to be severed exactly midway between each of the cotton patches. Adjustments in the length of this path, when needed, are effected by moving the position of the guide pin 61 to the right to lengthen the path and to the left to shorten the path. Movement of the pin 61 is accomplished by appropriately adjusting the position of the plate 60 about the guide pin 59 by means of a rod 61a pivotally connected with the plate 60 and which extends to the left where it passes through a slot presented in a portion of a bracket 61b perpendicular to the front plate and to which the bracket is secured. A threaded end on rod 61a accommodates a nut 61c, which by its position determines the adjustment of the small plate 60. A compression spring 61d encircling rod 61a and reacting between the fixed bracket 61b and an abutment on the rod serves to maintain the small plate 60 and, consequently, the guide pin 61 in position as determined by the setting of the adjusting nut 61c.

This reciprocating feeding mechanism comprises in part, a pair of parallel crank arms, 62 and 63, pivoted at their lower ends to rock about fixed parallel fore and aft axes and whose upper ends are linked together by a bar 64, which thereby is constrained to reciprocate with parallel motion as the crank arms oscillate in a direction left and right of the machine (Figs. 1, 2, 5 and 7). The crank arm 62 at the right has a hub portion arranged to rotate upon a fore and aft stud 65 whose rear end is fixed in the front frame plate 19. The crank arm 63 at the left has a similar hub portion which, however, is fixed upon a rock shaft 66 extending fore and aft of the machine. The rock shaft 66 is journaled in the front and rear machine frame plates, 19 and 20, and is operated in a manner subsequently described to effect the reciprocating movement of the parallel motion link 64.

The gauze-cotton strip passes from the guide pin 61 down and around another guide pin 67 fixed on and which projects forwardly from the parallel motion link 64. A pair of spaced collars 68 fixed on the pin 67 serves to guide the strip by engagement with its edges. From the pin 67, the strip passes into a feed clamp 69 comprising a plate 70 secured to the parallel motion link at the bottom and an overlying finger 71 pivoted on a forward extension of the left-hand link pin, which connects the crank arm 63 with the parallel motion bar 64. The strip is clamped between the plate 70 and the finger 71 by the action of a spring 72, which reacts between the top surface of the finger 71 and a seat presented by an overlying arm 73 that extends forwardly from the parallel motion link 64 at whose left end the arm 73 is secured.

Below the feed clamp 69, there is located a cutting block 74 carried by bracket 75 secured to the machine front plate, in spaced relation therewith, by means of bolts 76 and spacing sleeves 77 (Figs. 1 and 7). The cutting block presents a cutting edge at its leftmost end, which is disposed at right angles to the path of movement of the gauze strip and, while the cutting block is adjustable to proper position with respect to its supporting bracket, its adjusting means need not be described since it has nothing to do with the present invention.

As previously stated, rocking of the shaft 66 causes the parallel motion bar 64 to reciprocate in a direction left and right of the machine—to the left to advance the leading end portion of the composite gauze strip a given distance beyond the cutting edge of the cutting block 74 and then to the right, clear of the cutting edge to facilitate severing that portion of the gauze that has been advanced. It should be noted that at the moment the gauze strip is severed, the leftmost end of the gauze feeding clamp 69 is located somewhat to the right of the cutting block edge so as to leave a short free end portion of the gauze strip extending beyond the leading end of the feed clamp as the latter moves toward the left during its gauze feeding movement. A pair of small parallel plates 69a secured to the underlying plate 70 of the feed clamp adjacent the sides of the finger 71 serve to guide the gauze strip in its feeding movement by engagement with the lateral edges thereof.

Figure 2:
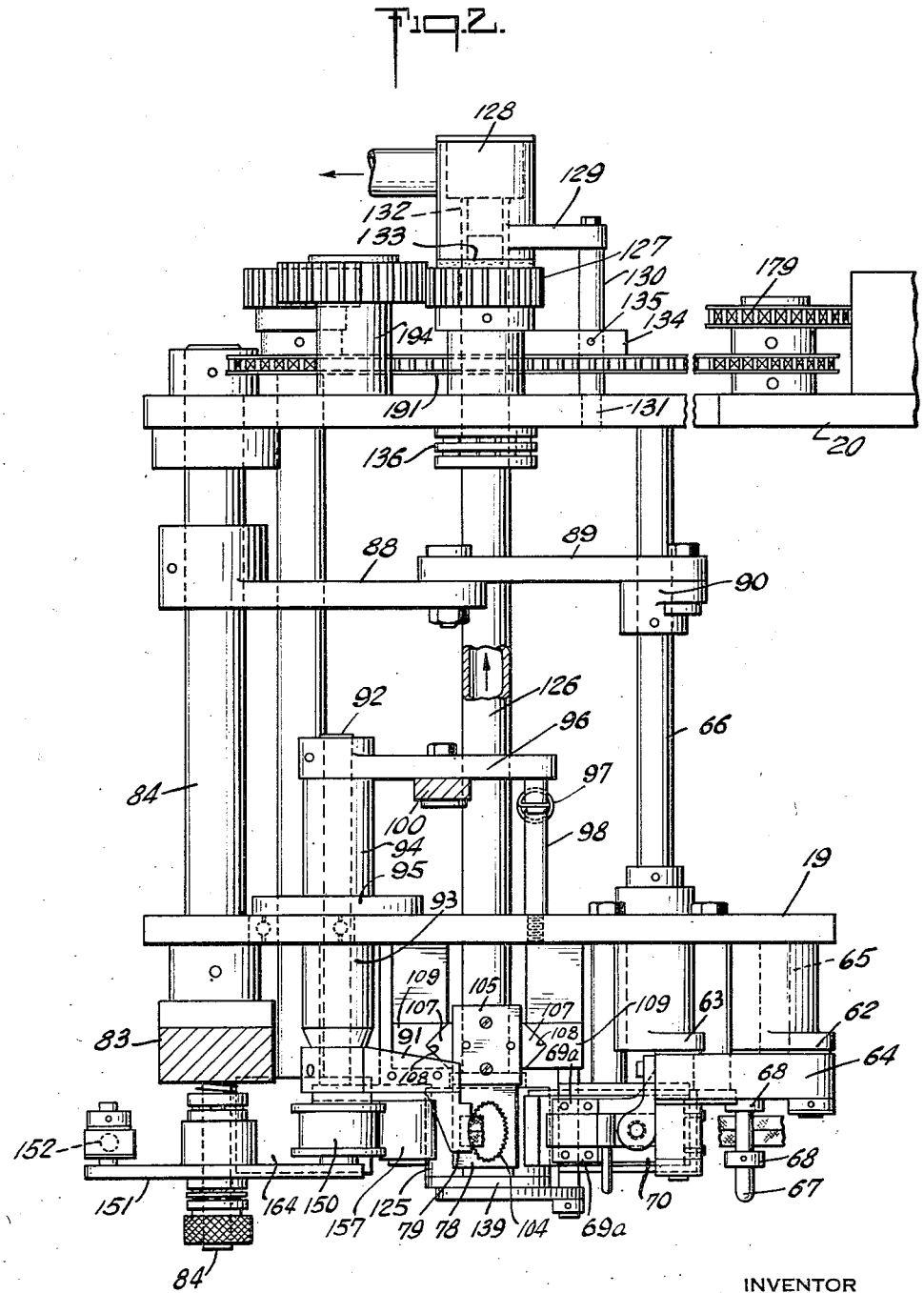
Fig. 2 is a horizontal sectional view on line 2—2 of Fig. 1.

When the gauze strip feeding clamp 69 is in its leftmost position, the free end of the gauze strip is grasped between a jaw 78 underlying the gauze strip and another jaw 79 overlying the gauze strip (Figs. 1, 2, and 13). These jaws serve to anchor the end of the gauze as the feed clamp 69 oscillates back to its rightmost position to uncover the portion of gauze strip to be severed and as an overlying knife 80 having a cutting member 80 moves down from above to cut off the anchored end of the gauze strip with a shearing action as the knife edge acts in cooperation with the knife block 74.

Figure 3:
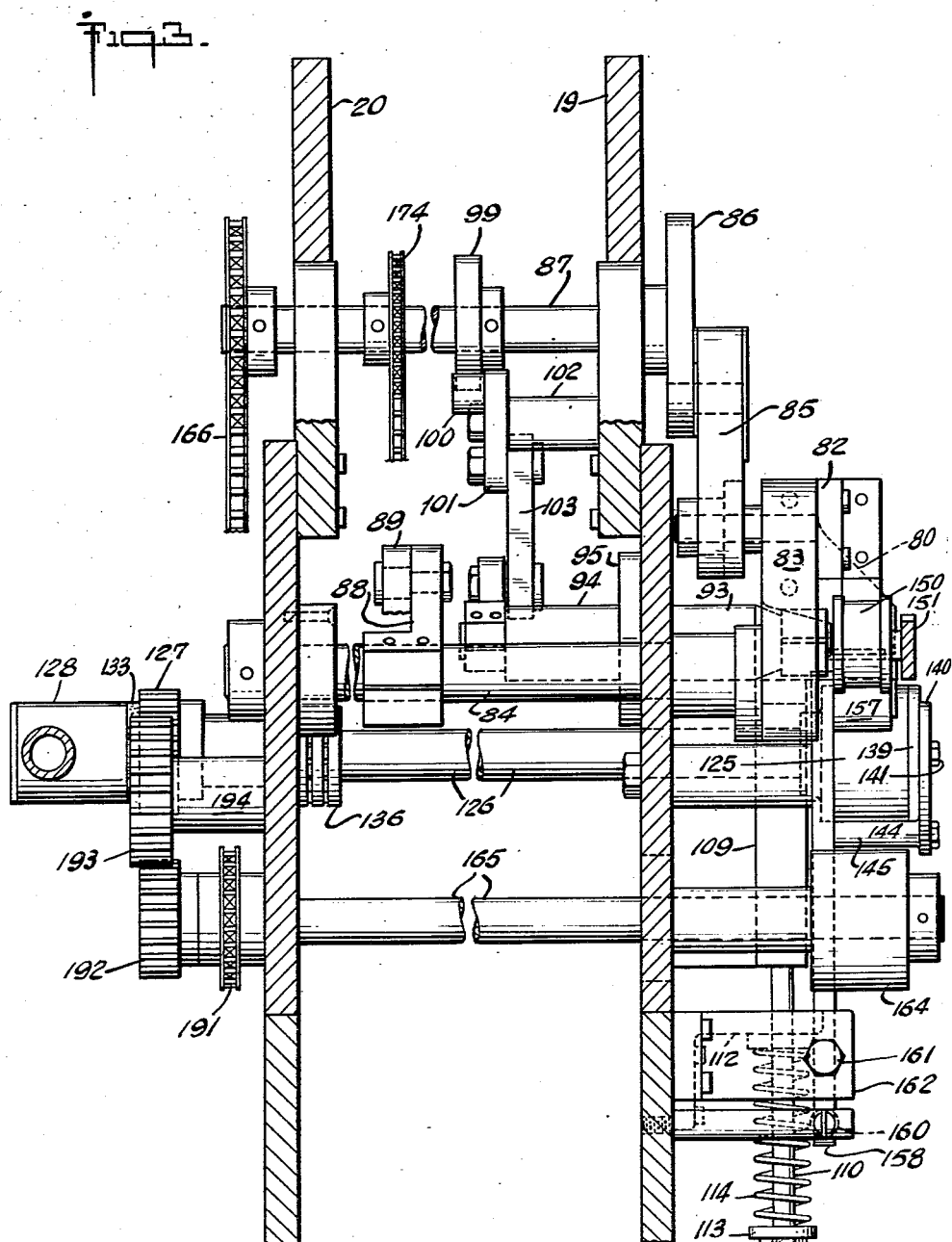
Fig. 3 is a vertical sectional view on line 3—3 of Fig. 1.

The knife 80 is in the form of a plate which is fixed to a block 82 bolted at the end of a right angularly shaped crank arm 83 whose other end is fixed at the front end of a rock shaft 84 extending fore and aft of the machine and journaled for rocking movement in the front and rear machine frame plates 19, 20 (Figs. 1, 2 and 3). A rod 85 pivotally connects the crank at its outer end with a disc 86 fixed at the front end of a continuously rotating shaft 87 disposed parallel with the rock shaft 84 and which likewise is journaled in the front and rear frame members 19, 20 of the machine. The connecting rod 85 is pivoted to the disc 86 at a distance from the disc's center of rotation less than the distance between center of rotation of the crank arm 83 and its pivotal connection with the rod 85. The result is that as the disc 86 is rotated by the shaft 87 on which it is mounted, the crank arm 83 reciprocates upwardly and downwardly, not only to actuate the knife 80, but also to rock the shaft 84 on which said crank arm is mounted.

Rocking of the shaft 84 effects oscillation of the parallel motion bar 64, which serves to feed the gauze strip (Figs. 2, 3 and 9). To this end, a crank arm 88 pinned at one end to the rock shaft 84, extends generally to the right for pivotal connection at its rightmost end with one end of a link 89 whose opposite end has pivotal connection with the outer end of a crank arm 90. Crank arm 90 at its inner end is pinned to the shaft 66 on whose outer end is mounted the arm 63 which oscillates the parallel motion bar 64 on which the feed jaw 69 is mounted. Thus it will be observed that when the position of the rock shaft 84 is such as to straighten out arm 88 and link 89, the feed jaw 69 is in its rightmost position, whereas, when the rock shaft is turned in a counterclockwise direction to jack-knife arm 88 and link 89 closed, the feed jaw 69 moves to the left to feed the gauze strip.

The continuously rotating shaft 87 also serves to operate the upper clamping jaw 79 which participates in grasping and holding the end portion of the gauze strip after it has been fed and during the cutting operation (Figs. 1, 2, 3 and 7). The clamping jaw 79 is secured on the underside of an arm 91 fixed at the front end of a short fore and aft rock shaft journaled in the front frame plate 19. The jaw 79 has a portion extending forwardly from its arm 91 to a position overlying the path of movement of the gauze strip and this position is maintained by holding the rock shaft 92 which carries the jaw against fore and aft endwise movement. This is accomplished by providing on the shaft 92 a spacer sleeve 93 between the arm 91 and the front face of the frame plate, journaling the shaft in a relatively long sleeve bearing 94 having an integral flange 95 fastened to the frame plate on its rear face, and by pinning to the shaft 92 at its rear end, the hub of an arm 96 which extends from the shaft in the same general direction as the arm 91 that carries the clamping jaw 79. The rock shaft 92 is biased to rotate in a clockwise direction, i. e., the direction which closes the clamping jaw upon the gauze strip, by a tension spring 97 connected between the rightmost end of the arm 96 and an underlying pin 98 fixed in the frame plate. The shaft 91 is rocked in the opposite direction to open the clamping jaw by an edge cam 99 fixed on the continuously rotating shaft 87 and which engages as the cam rotates, a follower 100 located at one end of a lever 101, fulcrumed at its center on a fixed pin 102 protruding rearwardly from the front frame plate and which at its other end is connected by a link 103 with the midsection of the arm 96 (Figs. 2, 3 and 10).

According to the arrangements that have been described, when the knife-carrying arm 83 is in its uppermost position, the associated rock shaft 84 which it operates has jack-knifed closed the crank arm 88 and link 89 as far as the parts will permit, thus to move the feed jaw 69 to its leftmost position wherein feed of the gauze strip has been completed. At this point, the follower 100 on the arm 101 which controls operation of the gauze clamping jaw 79 has reached the low point of its controlling cam 99 so as to permit the jaw under the influence of the spring 97 which acts upon it to move down and clamp the end of the gauze between it and the underlying die member 78.

From this topmost position, the knife carrying arm 83 turns in a clockwise direction to move the knife 80 downwardly to the gauze severing position, this operation causing the shaft 84 which it operates to rock in a direction to effect linear alignment of the crank arm 88 and link 89.

When crank arm 88 and link 89 are in linear alignment, parallel motion bar 64 and the feed jaws 69 carried thereby are in their rightmost position wherein a length of gauze strip extends from the clamping jaws 78, 79 to a position to the right of and beyond the cutting edge of the knife block 74. The timing of the parts in their operation is such that when the gauze feeding jaws 69 are in their rightmost position, the knife 80 cooperates with the knife block 74 to sever the gauze strip (Fig. 13).

The jaw 78 underlying the gauze strip and which cooperates with the jaw 79 overlying the gauze strip to hold the end of the gauze strip in position during the cutting operation has a flat upper surface whose left marginal area is active in the gauze-clamping operation. The jaw member 78 is formed just to the right of its center with an aperture 104 constituting a female die member whose characteristics and function are described in more detail later on. The female die member is located in the front half of a horizontal plate 105 whose rear half is fixed at the top of a slide 106 constrained to move in a vertical direction by laterally extending tongues 107, which engage in V-shaped grooves 108 recessed into the opposed inter-edges of a pair of guide members 109 fixed to the front frame plate of the machine and in spaced relation therewith (Figs. 1, 11 and 12). A vertical rod 110 threaded into the slide 106 at the bottom extends downwardly through an aperture 111 drilled in a horizontal leg of an angle bracket 112, likewise fixed to the front frame plate, and is equipped at its lower end with means constituting an abutment 113 which serves as a buttress for a compression spring 114 encircling the rod 110 and which reacts between the abutment 113 and the overlying leg of the bracket 112 through which rod 110 extends to bias the slide 106 and consequently the female die section 104 carried by the slide in a downward direction. The position of the die, however, is controlled by an edge cam 115 fixed at the front end of a shaft 116 extending in a direction fore and aft to the machine which continuously rotates and whose peripheral edge engages a cam follower 117 rotatably arranged at the midpoint of a crank arm 118, which at its right end rocks about a fixed pivot 119 and at its left end has a pivotal connection 120 with slide 106. According to this arrangement, when a high portion of cam 115 moves opposite the cam follower 117, slide 106 is moved to its uppermost position, whereas, when a lower portion of said cam moves opposite the cam follower, slide 106 moves downwardly under the action of its biasing spring 114. The configuration of the cam is such as well as the timing of its movement that female die member 104 for the most part is in its uppermost position, at least during the period when the gauze is being fed toward the left to clamping position, the period during which the end is clamped, and the period during which the gauze feeding jaws 69 are moving toward the right as the knife descends to the gauze-cutting position.

In the block 82 which carries gauze-cutting knife 80 there is a male die member 121 that cooperates with the female die member 104 to form the bandage pad. This die member is in two parts which are recessed at the top into the knife-carrying block 82 where they are held against endwise movement by a transverse pin 122, which, however, permits them to partake of a movement toward and away from each other because their opposed inner faces flair outwardly to provide clearance. A transverse spring 123 recessed into a hole presented by the inner face of one of the male die members and which presses against the opposed face of the other member, maintains the two members of this male die section in their outermost positions away from each other as determined by the walls of the recess in the knife-carrying block which accommodate them.

The left and right outer opposed surfaces of these male die members curve, in horizontal section, to the same configuration as the corresponding section of the female die member. The outer surfaces of the male die members, however, are smooth, whereas the corresponding inner surfaces of the female die member present a series of vertically disposed and closely arranged small ridges 124 for a purpose which presently will be made clear.

As stated previously, the feed of the gauze strip is such that each cut made by the knife 80 is directly midway between each two adjacent patches of cotton. Each cotton patch itself, which is enclosed within the piece of folded gauze that is cut off, is directly over the female die member and under the male die member, while the end sections, which are devoid of cotton filler, are supported by those portions of the die member 78 that extend beyond the die opening 104 (Figs. 13 and 14). Immediately after a length of gauze has been severed the male die 121 engages the severed section and moves it downwardly into the female die section 104, the gauze-clamping jaw 79 being moved to release the cut-off gauze section simultaneously in the short increment of time after the gauze has been cut and before its engagement by the male die section (Fig. 13).

As the male die section passes down through the female die section, it presses the gauze pad member against the rounded surface of an underlying hollow cylindrical element 125 (Figs. 1, 2, 3, 13 to 16). The hollow cylindrical member 125 is mounted at the front end of a long hollow shaft 126 of reduced diameter and journaled for rotation in the front and rear frames 19, 20 of the machine. On the hollow shaft 126 rearwardly of the frame member 20, there is fixed a pinion gear 127 through which the hollow shaft is rotated intermittently through angular increments of 120°. The hollow shaft extends rearwardly beyond the pinion to accommodate an elbow fitting 128 which has a connection to a source through which suction is established in the shaft. A leg 129 formed integrally with and extending radially from the fitting 128 is drilled near its outer end to receive a rod 130, which extends forwardly into a hole 131 in the rear frame member 20 to hold the fitting 128 against turning. A nylon bushing 132 encircling the shaft 126 within the fitting and which has a flange 133 between the fitting and the gear face is held against turning with respect to the fitting and serves as a suitable antifriction bearing between the parts. A dog 134 adjustable along the rod 130 and provided with a set screw 135 for securing it to the rod in any desired position of adjustment engages behind a shoulder on gear 127 to hold the fitting 128 from moving rearwardly endwise with respect to the hollow shaft inadvertently for any reason. Normally the suction within the parts tends to hold them together. A thrust bearing 136 between the hollow shaft and the rear frame plate 20 likewise accommodates a force, tending to move shaft 126 rearwardly as a result of the vacuum.

The enlarged hollow cylindrical member 125 at the front end of the shaft 126 is closed at the front by a nylon fitting 137 having a cylindrical body portion 138 telescoping within and in surface contact with said cylindrical member and having also a closed front face with radially extending flange 139 held tightly against the front edge of said cylindrical member (Figs. 1, 3 and 13). The nylon fitting 138 is held against movement in a fore and aft direction by a plate 140 which is parallel with the closed front face of the nylon fitting and fastened to it by a centrally located screw 141 that passes through the plate and is threaded into the nylon fitting. The fitting is arranged for limited rotatable adjustment about the axis of screw 141, but normally is held in any given position of adjustment by a pair of screws 142 passing through diametrically located and circumferentially elongated slots 143 in the plate 140 and which, too, are threaded into the nylon fitting. Plate 140, itself, is held fixed by a screw 144 that passes through the plate 140 in a fore and aft direction at a position displaced laterally from cylindrical member 125, the screw at the rear of the plate being encircled by a spacing sleeve 145 and threaded into the guide member 109 at the right.

The cylindrical member 125 is rotatable to bring one or another of three different stations thereon opposite the bottom of male die 121 as it passes through female die 104. These stations are spaced equally around the cylinder, i. e., 120° apart, and comprise each a slightly raised platform or boss 146 protruding above the outer cylindrical surface thereof and equipped each with a plurality of radially disposed holes 147 interconnecting the chamber within member 125 with the atmosphere (Figs. 11 and 13).

That portion of the nylon member 138 that telescopes within the cylindrical chamber 125 is cut away for about 90° of its circumference. The remaining portion normally seals off the holes 147 in the various stations, but when each such station is turned into position beneath the pad-forming die, the holes 147 at that station are uncovered as they move clear of that edge 148 of the nylon fitting defining one side of said 90° cut-away portion. The location of the edge 148 is such that when each station arrives opposite the die 104, all its holes have been uncovered so that the vacuum in the cylindrical member creates a substantial suction through the holes 147 from the outer atmosphere (Fig. 13).

With one station of the cylindrical member in its operative position as described and the suction active through the holes thereof, the knife 80 severs a portion of the strip for the pad and the male die 121 pushes the severed portion down through the female die 104 and deposits it on the underlying station 146, where the suction holds it (Fig. 14). Because of the external convex configuration of the male die and the complementary internal concave configuration of the female die, the folded-up portions or flaps of the pad as they pass down through the female die have in effect a cylindrical configuration. With respect to these folded-up portions, the length of an arc along a horizontal section thereof, i. e., around the convex portion of the male die is the same as the actual width in a direction fore and aft of the machine of that portion of the pad deposited on the boss 146 of cylindrical member 125. The length of the chord subtended by such arc, accordingly, will be substantially less than the actual width of the pad itself.

After the male die 121 has reached its lowermost position, the female die 104 starts down under the action of its operating mechanism previously described to strip the folded-up flaps from the male die (Fig. 15). It will be recalled that the female die is formed on its inner surface with a series of relatively closely-spaced vertical ridges which, where they intersect the under face of the female die, which incidentally is rounded to a radius substantially corresponding to that of the boss 146, present relatively sharp points. Initially, these points are located near the top ends of the folded-up flaps (Fig. 14), and when the female die starts downwardly to strip the flaps off the male die section, these sharp points dig in to the gauze and prevent its movement in any direction relative to such points. Consequently, as the female die section moves downwardly, the end folds are displaced outwardly endwise of the pad, but without permitting the flaps to expand in a lateral direction. The result is that those ends of the flap which, in effect, are a continuation of the lateral edges of the pad, angle inwardly so as to produce folded-back flaps of the character illustrated in Fig. 18. Shortly after the female die section starts to move downwardly, the male die section starts to move upwardly to facilitate the stripping operation.

When the folded-back flaps have been pushed down as illustrated in Fig. 15 to the position illustrated in Fig. 16, the flaps are held in that position against movement with respect to other parts of the pad by the suction exerted through the holes 147 in the walls of the cylindrical member 125. When the pad has been completed in the manner described, the female die section moves upwardly back to its normal position.

While the gauze-strip composite is threading through the machine, a strip of adhesive tape 149 having one side coated with normally tacky, pressure-sensitive adhesive is threading through the machine from a source not shown with the adhesive side up to an idler roller 150 mounted at the end of a lever 151 which is centrally fulcrumed on the shaft 84, which accommodates the knife-carrying arm 83, and whose other end is linked by means of a rod 152 to a bracket 153 fixed on the front frame of the machine (Fig. 1). The rod 152 passes down through a hole in a horizontal leg in the bracket 153 and is provided at its lower end with an adjustable knurled nut 154 abutting against the under face of such horizontal leg to determine thereby the adjusted position of the idler roller. A compression spring 155 encircling the rod 152 and reacting between the top surface of the bracket 153 at its lower end and the under side of a nut 156, likewise, threaded onto the rod 152, at its upper end, resiliently holds the rod and consequently, the idler roller in its adjusted position.

After leaving the idler roller 150, the tape 149 passes with its adhesive side up, around another idler roller 157 carried at the upper end of a lever 158 fulcrumed near its upper end on a pin 159 fixed in the front frame of the machine and whose lower end is pulled by a spring 160, likewise having a fixed anchorage in said front frame resiliently to effect the engagement of its left edge with a set screw 161 threaded through a fixed bracket 162 and which is adjustable to determine the normal position of the lever 158 and, consequently, of said idler roller 157 (Fig. 1).

After a pad has been formed on the head 146 in operative location and while its ends are held in folded-back position by the suction then acting, the cylinder 125 is rotated in a counterclockwise direction to bring the pad into engagement with the adhesive face of the tape 149 which, at the point where it rounds the idler roller 157, is close to the surface of the hollow cylinder 125. As the cylinder moves to bring the leading end of the pad into engagement with the adhesive on the tape 149, the apertures 147 beneath the pad come abreast of an edge 163 of nylon fitting 139 defining the end of the 90° cutout portion thereof. The suction through the apertures, thereby, is cut off and transfer of the pad to the tape completed without difficulty.

Continued movement of the cylinder 125 through to complete an angular displacement of 120° brings a new head into active position to receive the next pad formed by the dies. The operation of the parts is such that the adhesive tape and the bosses 146 on which the pads are received have the same intermittent motion and the same linear speed of travel. The dimensions of the hollow cylinder also are such that the distance between pad-receiving heads gives a length of tape between pads deposited thereon sufficient to make the flaps that extend beyond the pad when the bandage is completed. It should be understood that at a position further along in the machine, the adhesive tape is severed midway between each of the bandage pads that have been deposited thereon.

The force or pressure with which the pad is pressed into contact with the adhesive tape is determined by the spring 160 as the idler roller carried by the lever on which the spring acts yields as the pad is moved into engagement with the tape threaded around it. In this way, all of the bandages manufactured on the machine have their pads applied to the tape at uniform pressure.

After the pad has been deposited on the tape, the composite proceeds to a roll 164 around which the composite passes and from whence it travels to another phase of the machine where further operations, such as application of the protective facing and wrapping of the completed bandage, take place. Roll 164 is fixed at the front end of a fore and aft shaft 165 journaled in the front and rear frame plates of the machine and intermittently driven so as to assist the passage of the composite strip through the machine.

Figure 4:
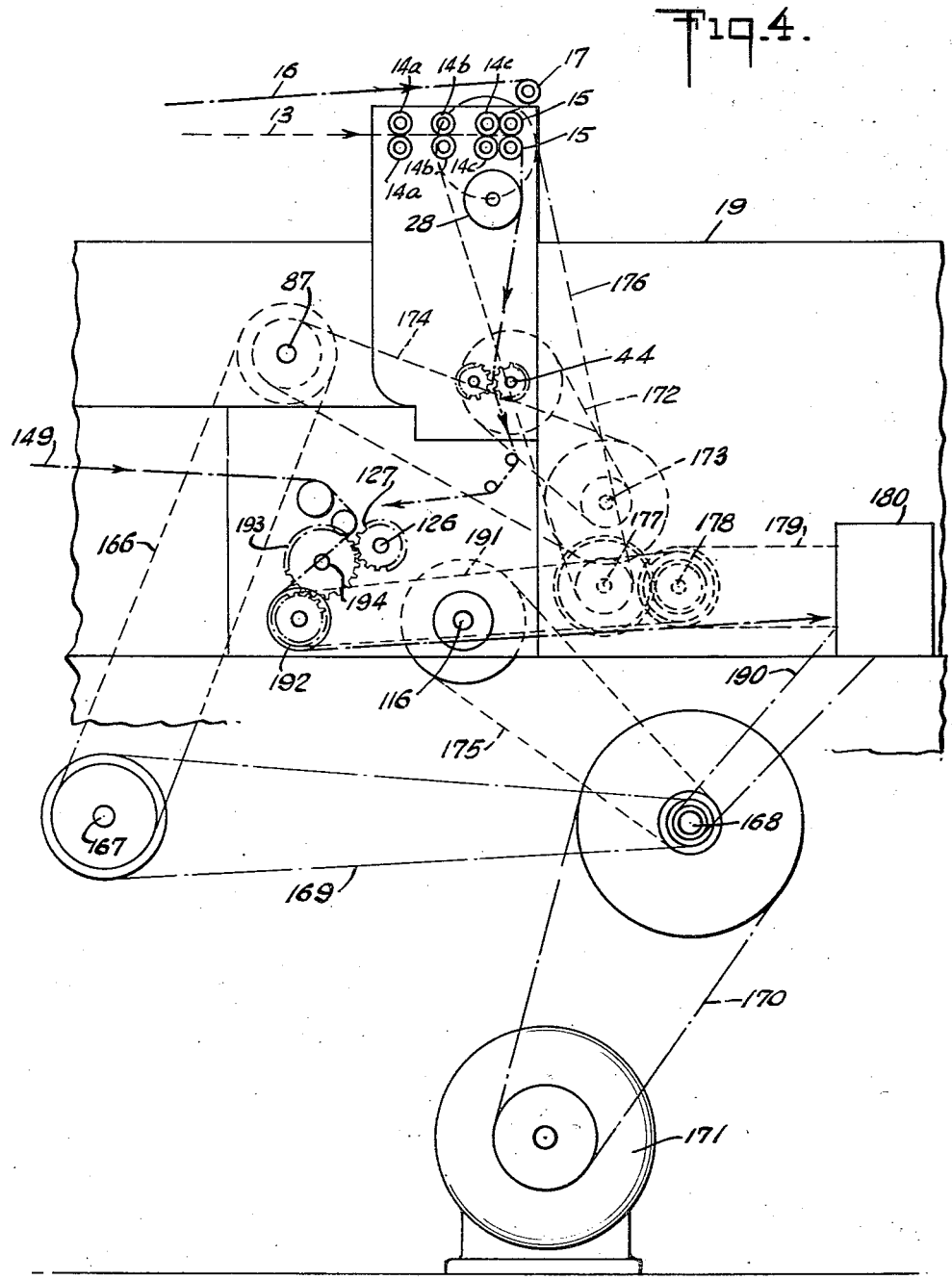
Fig. 4 is a view diagrammatically illustrating the driving connections of the machine.

To complete the description of the machine, it will be recalled that there are three continuously-driven shafts operating the various mechanisms, i. e., shafts 44, 87 and 116 (Fig. 4). Shaft 44 rotates pull rolls 42 and 43, which act initially on the gauze-cotton composite to pull it down from the cotton break-off rolls and through the gauze-folding mechanism. Shaft 87 reciprocates the knife arm 83 which effects operation of the gauze-cutting knife carried by the arm and also operation of rock shaft 84 on which arm 83 is mounted. Rock shaft 84 in turn causes reciprocation of parallel motion bar 64 that carries the gauze-feeding clamp. Because of the various connections between these mechanisms, each rotation of the shaft 87 corresponds to a cycle of movement for knife-carrying arm 83 and of the reciprocating feed mechanism. As shown in Fig. 4, continuous rotation of shaft 87 is effected by a chain drive 166 from an intermediate shaft 167, which in turn is driven from pulley shaft 168 through chain drive 169. Pulley shaft 168 has a belt drive 170 from a source of power as, for instance, a motor 171. Shaft 44 that effects the gauze-strip feed has a chain drive 172 from a counter-shaft 173 which, itself, has a chain drive 174 from shaft 87. Because of this interconnection between shaft 87 and shaft 44, provision can be made for a constant feed of the composite strip for each rotation of shaft 87. In this way, the length of the gauze composite severed during each cycle of operation of the machine can be regulated and held constant. It will be further understood that by adjusting the mechanism to which reference has been made for controlling the length of the composite strip between the cotton break-off rollers and the edge of the knife block where the strip is cut and assuming that the cotton patches are deposited on the gauze at equally spaced intervals, as it is, severance of the composite strip equally between each of the cotton patches can be accomplished without difficulty.

The third continuously-driven shaft 116 causes up and down reciprocation of the female die member 104. It has a chain drive 175 directly from shaft 168 which drives shaft 87 and its proper timing is effected by appropriate design of the sprocket sizes.

The drive between shaft 87 and the knife arm 83 gives constant acceleration and deceleration so that the parts operated thereby are substantially free of shock and, consequently, wear and tear. Acceleration and deceleration of the movements of the female die member may, of course, be suitably controlled by proper design of the edge cam 115 through which the female die slide 106 is operated.

There are also three intermittently operating shafts driving various mechanisms of the machine, i. e., shafts 14c, 126 and 165. Shaft 14c operates the rolls of the draw frame in well-known fashion. It has a chain drive 176 from shaft 177 geared to shaft 178 which in turn has a chain drive 179 from an intermittent drive 80 of type illustrated in Ganz Patent 2,521,211, which illustrates a number of the various devices for converting continuous motion to intermittent motion evenly and without shock. Intermittent drive mechanism 180 may have a chain drive 190 from pulley shaft 168. Intermittently-operated hollow shaft 126, which transfers the folded pad from the forming position into engagement with the adhesive surface of the tape, and intermittently-operated shaft 165 which feeds along the adhesive tape after the bandage pad has been deposited thereon are likewise driven from the intermittent motion mechanism 180. Shaft 165 may have a direct chain-drive connection 191 from shaft 178. Shaft 126 through the gear 127, a gear 192 on shaft 165, and an intermediate idler gear 193 on a stub shaft 194 supported by the rear frame plate of the machine is driven from shaft 165 (Figs. 2, 3 and 4). The chain and gear connections to which reference has just been made insure that the adhesive tape is fed along at a speed appropriate to receive the bandage pads and with the desired intervals between them. Operating the draw frame and pad-transfer device from the same intermittent drive insures that there will always be a patch of cotton cut off for each pad that later is delivered to the adhesive strip.

It is thought that operation of the machine will be clear from what has been said without further detailed description. The invention has been described with reference to one embodiment thereof, but many others are included within its spirit. It is to be limited, therefore, only by the scope of the appended claims.

The claims are:

1. A bandage pad-forming machine which comprises, in combination, means for advancing bandage-strip material endwise to a given location, means cyclically operable at said location for folding an end portion of a section of the strip material back upon itself, devices operable to hold by suction said end portion of the section of strip material in its folded-back position and movable while the end portion is so held to transfer said section to a different location and means for actuating the strip advancing means and the cyclically operable folding means, and for effecting the transfer movement of the strip material holding devices all in timed relation each with the other.

2. A bandage pad-forming machine which comprises, in combination, means for advancing bandage-strip material endwise to a given location, means cyclically operable at said location for folding an end portion of a section of the strip material back upon itself, a hollow member presenting an external face area for receiving said section and cooperating in the folding thereof, said member being equipped with ducts for establishing communication between its hollow interior and its face area, and being movable to transfer the folded section to a different location, means for establishing suction through said ducts for holding the folded-back end of the section in its folded position and means for actuating the strip advancing means and the cyclically operable folding means, and for effecting the transfer movement of the strip material holding devices all in timed relation each with the other.

3. A bandage pad-forming machine which comprises, in combination, means for advancing bandage-strip material endwise to a given location, means operable at said location for folding an end portion of a section of the strip material back upon itself, devices operable to hold by suction said end portion in its folded-back position and movable while said end portion is so held to transfer the section to a different location, and means at said different location for bringing a different portion of a bandage unit into engagement with said section in manner to hold, in the completed bandage, the folded end portion of said section in folded position.

4. A bandage forming machine which comprises, in combination, means for advancing bandage-strip material endwise to a given location, means operable at said location for folding an end portion of a section of the strip material back upon itself, a hollow member presenting an external face area for receiving said section and cooperating in the folding thereof, said member being equipped with ducts for establishing communication between its hollow interior and its face area and being movable to transfer the folded section to a second location, means at said different location for bringing a different portion of a bandage unit into engagement with said section in manner to hold in the completed bandage the folded-end portion thereof in folded position, and means for establishing suction through said ducts at the first location to hold the end portion of the section in its folded position, and for disestablishing the suction at the second location.

5. A bandage-forming machine which comprises, in combination, means for advancing bandage-strip material endwise to a severing location, a cutter operable at said location to sever transversely a section of the strip material, means for folding a portion at each end of the severed section back upon itself, and devices operable to hold by suction said end portions in their folded-back positions and movable while the end portions are so held to transfer the severed section to a different location.

6. A bandage-forming machine which comprises, in combination, means for advancing bandage-strip material endwise to a severing location, a cutter operable at said location to sever transversely a section of the strip-material, means for folding a portion at each end of the severed section back upon a midportion thereof, devices operable to hold by suction said end portions in their folded-back positions and movable while the end portions are so held to transfer the severed section to a second location, and means at the second location for presenting to each folded-back end portion another portion of the bandage unit in manner permanently to hold said folded end portions in folded position in the completed bandage.

7. A bandage-forming machine according to claim 6 wherein means are provided for disestablishing suction at the second location when engagement between the different bandage portions is established.

8. A bandage-forming machine according to claim 6 wherein the devices operable to hold by suction the folded ends of the bandage section include cylindrical surface means against which the bandage section is held and which are movable between said two locations by rotation.

9. A bandage-forming machine according to claim 8 wherein instrumentalities overlying the cylindrical surface means reciprocate to move each section as it is severed downwardly into engagement with said cylindrical surface means.

10. A bandage-forming machine according to claim 6 wherein the means for folding the end portions of the severed section back upon the midportion thereof includes a first means to support the end portions of the severed section and a second means relatively movable with respect to the first means during one phase of the machine cycle to bring the midportion of the severed section under the influence of the suction devices whereby said end portions are folded up about said second means, and said first means being relatively movable with respect to the second means during a different phase of the machine cycle to strip the end portions from the second means and fold them down against the said midportion whereby they, too, come under the influence of the suction devices.

11. A bandage-forming machine according to claim 10 wherein said second means is equipped with curved edges to form folds between the midportion and the end portions with configurations correspondingly curved.

12. A bandage-forming machine according to claim 10 wherein said second means is equipped with curved edges to form folds between the midportion and the end portions with configurations correspondingly curved and wherein said second means acts to maintain said curved configuration of the folds during the stripping of the end sections from the second mentioned means.

13. A bandage-forming machine according to claim 10 wherein there is associated with the first-mentioned means, devices movable to engage the severed section and maintain it properly located for engagement by the second mentioned means.

14. In a bandage pad-making machine, bandage pad-forming apparatus including relatively movable male and female die members having complementary curved surfaces, the members being adapted upon such relative movement when in one direction and with the interposition of bandage-pad material therebetween to fold the pad material along a curve substantially corresponding to that possessed by the male die member, and means on the female die member adapted upon relative movement between the members in the opposite direction, to strip the bandage material from the male die member while maintaining a curve of substantially the same configuration in such bandage material.

15. Apparatus according to claim 14 wherein the means on the female die section include a plurality of closely arranged small ridge elements having a disposition directionally the same as the direction of relative movement between the members and whose ends which lead during the stripping-off movement between the members act to engage into the bandage material and hold it positively during the stripping-off operation.

16. A bandage-forming machine according to claim 6 wherein the means at the second location includes adhesive-strip feeding devices operable to feed adhesive strip material and so located as to present such material with its adhesive face in contact with the folded-back end portions of the severed section of bandage strip material as said severed section is transferred to said second location.

17. A bandage-forming machine according to claim 16 wherein the adhesive-strip feeding devices and the means for transferring the severed bandage-strip section to the second location operate intermittently and in synchronism.

References Cited in the file of this patent

UNITED STATES PATENTS

| 2,029,260 | Eustis et al. | Jan. 28, 1936 |
| 2,384,231 | Bamford | Sept. 4, 1945 |
| 2,476,924 | Stenvall | July 19, 1949 |
| 2,484,336 | Epstein | Oct. 11, 1949 |
| 2,642,116 | Fisher et al. | June 16, 1953 |